(12) United States Patent
Studerus et al.

(10) Patent No.: US 12,494,097 B2
(45) Date of Patent: Dec. 9, 2025

(54) ACCESS CONTROL CONFIGURING METHOD AND DEVICE

(71) Applicant: dormakaba Schweiz AG, Rümlang (CH)

(72) Inventors: Paul Studerus, Oberweningen (CH); André Lüscher, Feldmeilen (CH)

(73) Assignee: dormakaba Schweiz AG, Rumlang (CH)

( * ) Notice: Subject to any disclaimer, the term of this patent is extended or adjusted under 35 U.S.C. 154(b) by 13 days.

(21) Appl. No.: 18/263,507

(22) PCT Filed: Jan. 28, 2022

(86) PCT No.: PCT/EP2022/052096
§ 371 (c)(1),
(2) Date: Jul. 28, 2023

(87) PCT Pub. No.: WO2022/162172
PCT Pub. Date: Aug. 4, 2022

(65) Prior Publication Data
US 2024/0112513 A1    Apr. 4, 2024

(30) Foreign Application Priority Data
Feb. 1, 2021  (CH) .................................. 00091/21

(51) Int. Cl.
*B60R 25/24*     (2013.01)
*G07C 9/00*      (2020.01)
*G07C 9/29*      (2020.01)

(52) U.S. Cl.
CPC ........... *G07C 9/00309* (2013.01); *G07C 9/29* (2020.01)

(58) Field of Classification Search
CPC ........... G07C 9/00309; G07C 2209/63; H04W 4/029; H04W 4/023; H04W 4/80; H04W 4/021
See application file for complete search history.

(56) References Cited

U.S. PATENT DOCUMENTS

| 2017/0140585 A1* | 5/2017 | Booth ..................... G07C 9/37 |
| 2017/0270565 A1* | 9/2017 | Filatoff ................. H04W 4/029 |

(Continued)

FOREIGN PATENT DOCUMENTS

EP    3147869 A1    3/2017

OTHER PUBLICATIONS

International Search Report and Written Opinion of the International Searching Authority for International Application No. PCT/EP2022/052096, mailed on May 3, 2022, in 13 pages.

(Continued)

*Primary Examiner* — Vernal U Brown
(74) *Attorney, Agent, or Firm* — Knobbe, Martens, Olson & Bear, LLP

(57) ABSTRACT

A method, devices, and a system is proposed for configuring a security control system of a secure control area, the method comprising exchanging UWB transmission(s) between a mobile communication device and one or more access control devices of the security control system, determining location information of the mobile communication device within the secure control area, receiving, by the mobile communication device, one or more user inputs comprising one or more relationship indication(s) of one or more relationship(s) between the respective location(s) of the mobile communication device and one or more security perimeters of the secure control area; and generating layout information relating to a physical layout of the one or more security perimeters within the secure control area using the (Continued)

location information and the one or more relationship indications.

14 Claims, 12 Drawing Sheets

(56) References Cited

U.S. PATENT DOCUMENTS

| | | |
|---|---|---|
| 2019/0246241 A1 | 8/2019 | Hollar et al. |
| 2019/0340876 A1 | 11/2019 | Northrup et al. |
| 2020/0168017 A1* | 5/2020 | Prostko ................. G01S 13/886 |
| 2020/0393248 A1* | 12/2020 | Khan ................... G01C 21/383 |

OTHER PUBLICATIONS

Search Report for Swiss Patent Application No. CH 00091/21, dated May 27, 2021, in 5 pages.

* cited by examiner

ACCESS CONTROL CONFIGURING METHOD AND DEVICE

CROSS-REFERENCE TO RELATED APPLICATIONS

This application is the U.S. National Phase under 35 U.S.C. § 371 of International Application No. PCT/EP2022/052096, filed Jan. 28, 2022, titled ACCESS CONTROL CONFIGURING METHOD AND DEVICE, which claims priority to CH Patent Application No. 00091/21, filed Feb. 1, 2021, the entirety of each of which is hereby expressly incorporated by reference herein.

FIELD OF THE INVENTION

The present invention relates to a method and a mobile communication device for configuring a security control system. The present invention also relates to a computer program product comprising computer-executable instructions which, when executed by a processor of a mobile communication device, causes the mobile communication device to carry out the method for configuring the security control system.

BACKGROUND OF THE INVENTION

Keyless entry systems have become widely used in applications, in particular for access control in building facilities. Access control relates to granting, denying or limiting access to a secure controlled area, usually by means of some level of access control by use of a barrier, such as a door, turnstile, parking gate, elevator door, or other barrier.

Using ultra-wideband (UWB) transmissions for security control systems is particularly advantageous, because an access control device of the security control system and a mobile communication device or an authentication device carried by a user can accurately and securely calculate the distance between each other using the round trip time of flight. The access control device can accurately determine the distance to the mobile communication device, and vice versa. This has enabled security control systems to perform access control more seamlessly as a user's mobile communication device does not need to be presented in close proximity with a reader device, as opposed to other keyless entry systems which require a user to hold a card or token to the reader device, for example an RFID or NFC card.

By exchanging authentication information between the access control device and the mobile communication device or authentication device, the security control system can enable the user to gain access to the secure controlled area.

The access control device can be integrated into an access control terminal, for example an access control terminal connected to a barrier and configured to allow entry through the barrier for authenticated users. The access control device can also be a separate device to the access control terminal and configured to locate, or track a movement, of the user. The access control system will typically begin an authentication process when the communication device is within a communication range of the access control device, or when a signal strength of a received transmission exceeds a particular threshold.

Installing and configuring the security control system remains a laborious process, however, often because detailed maps and layout information, for example including a 2D or 3D model, of the building facility and the security control system must be known beforehand. In particular, the layout of secure controlled areas, the precise location of the access control devices, the access control terminals, and/or the barriers must either be known beforehand or added after installing the access control devices, such that the mobile communication device or authentication device of the user can be accurately located and tracked relative to the secure controlled areas of the building.

SUMMARY OF THE INVENTION

It is an object of embodiments disclosed herein to provide a method, a mobile communication device and a computer program product for configuring a security control system which overcome one or more of the disadvantages of the prior art.

In particular, it is an object of embodiments disclosed herein to provide a method, a mobile communication device and a computer program product for configuring a security control system which is more flexible and efficient than those known from the prior art.

According to embodiments of the present disclosure, the above-mentioned objects are achieved by a method for configuring a security control system of a secure control area. The method comprises a number of steps including exchanging ultra-wideband (UWB) transmission(s) between a mobile communication device and one or more access control devices of the security control system. The steps include determining location information of the mobile communication device within the secure control area by processing signal properties of the UWB transmission(s), the location information being indicative of one or more location(s) of the mobile communication device within the secure control area. The steps include receiving, by the mobile communication device, one or more user inputs from a user of the mobile communication device, comprising one or more relationship indication(s) of one or more relationship(s) between the respective location(s) of the mobile communication device and one or more security perimeters of the secure control area. The steps include generating layout information relating to a physical layout of the one or more security perimeters within the secure control area using the location information and the one or more relationship indications.

In the present disclosure, the mobile communication device is used to configure the security control system, in particular the physical layout of the security perimeters. Authentication devices, on the other hand, are used in the configured security control system for authenticating further users carrying the authentication devices, in particular in order to grant or deny access to secure control areas, physical access to which is limited by a barrier connected to the access control device. Authentication is performed once the authentication device is within the security perimeter. The physical layout of the security perimeter refers to its virtual spatial arrangement and extent in the real world. If the security perimeter is too small, then the user of the authentication device may have to wait in front of the barrier for access control to be performed. On the other hand, if the security perimeter is too large, then access control may be performed too soon, and another user in front of the user carrying the authentication device may inadvertently be granted access through the barrier to the secure control area instead of, or in addition to, the user with the authentication device.

An advantage of the present method is that the physical layout of the one or more security perimeters of the secure control area is defined, in an embodiment, by where the mobile communication device is located while receiving the user inputs. This has the advantage that the security perimeters, which govern where an authentication device must be located in relation to an access control device or a barrier for access control to take place, do not have to be pre-defined. Rather, the security perimeters can be established during configuring of the security control system in the secure control area by a user with a mobile communication device, i.e. at the installation site, for example by the user walking along a line that is to be defined as a security perimeter while location information of the mobile communication device is recorded.

Further, as explained below in more detail, in an embodiment, the physical layout of the security perimeters is pre-defined and provided to the mobile communication device during configuration. The location(s) of the mobile communication device while receiving the user input(s) are used to refine the physical layout of the one or more security perimeters. Further, as also explained below in more detail, the location(s) of the mobile communication device while receiving the user input(s) is used in an embodiment where an installed location of an access control device, in terms of the coordinates in the secure control area, in particular in relation to one or more barriers, is not known precisely. Typically, the access control device has a planned location where it should be installed during commissioning of the security control system. However, due to unforeseen circumstances and/or imprecision, the access control device cannot always be installed at the precise planned location, which planned location may be stored in memory as an installed location as part of the layout information of the secure control area. The location(s) of the mobile communication device is therefore used to calibrate the installed location of the access control device, such that the installed location corresponds to the actual installation location of the access control device.

In an embodiment, the location information includes one or more of the following: a distance between the mobile communication device and the one or more access control devices, a 2D or 3D position, in particular a position defined using 2D coordinates or 3D coordinates, of the mobile communication device relative to the one or more access control devices, or an absolute physical location of the mobile communication device within the secure control area.

Determining the distance between the access control device and the mobile communication device by processing signal properties of ultra-wideband UWB transmissions is particularly advantageous as it allows a reliable and precise determination of the distance(s). In an embodiment where the access control device has one antenna, the distance between the access control device and the mobile communication device is determined by processing the signal properties of the UWB transmissions, in particular by using a propagation time (e.g. a one-way propagation time or a two-way propagation time).

Determining a distance based on the propagation time of an UWB transmission comprises measuring the time required for a signal to travel from an UWB transceiver of the access control device to the UWB communication module of the mobile communication device and/or the time required for a signal to travel from the mobile communication device to the UWB transceiver. In a particular embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the UWB transceiver sending a first UWB transmission and the mobile communication device receiving the first UWB transmission, or a "round-trip time-of-flight" time difference, in which a second UWB transmission takes place from the mobile communication device to the UWB transceiver either prior to, or after the first UWB transmission. In the "one-way time-of-flight" scenario, the UWB transceiver and the mobile communication device need to be provided with tightly synchronized clocks for accurately determining the distance. In the latter case of a "round-trip time-of-flight" calculation, there is stored, either in the mobile communication device or the UWB transceiver, an accurate representation of the processing time, i.e. the time it takes between the reception of an UWB transmission and the sending of a response UWB transmission, which processing time allows for accurately determining the distance. Measurement of a time required for the signal to travel from the UWB transceiver to the mobile communication device and back "round-trip time-of-flight" is advantageous as it does not require the precise synchronization of clock signals of the UWB transceiver and the mobile communication device.

In an embodiment, the access control devices have two or more UWB transceivers configured for receiving UWB transmissions. With two UWB transceivers, at least a 2D position of the mobile communication device can be determined using a difference in propagation times between the antennas and the access control device. The 2D position is, for example, a position with no height or elevation information. For example, the 2D position enables the position of the mobile communication device on a floor plan to be determined. With three antennas, at least a 3D position of the mobile communication device using trilateration can be determined.

In an embodiment, two or more access control devices, each having at least one UWB transceiver, exchange data in order that a 2D and/or a 3D position of the mobile communication device can be determined. This is advantageous as it enables, for example, access control devices having only a single antenna to be used in determining the 2D or the 3D position of the mobile communication device. Further, it enables two or more access control devices having multiple antennas to be used to further improve the accuracy of the 2D and/or the 3D position of the mobile communication device.

In an embodiment, the two or more access control devices are configured such that a given access control device exchanges UWB transmissions with another access control device such that a distance to and/or 2D or 3D position the other access control device can be determined. This is advantageous as it enables accurate relative positions of the access control devices to be determined.

In an embodiment, installation location information for at least one access control device is known or pre-determined. This is advantageous as it allows for an absolute position of the mobile communication device to be determined, in particular an absolute position within the secure control area. In other embodiments, a geometry, for example including a floor plan, and/or further properties of the secure control area which influence UWB signal transmission are known or determined to improve the accuracy, precision, and/or reliability of the determined location information.

The one or more user inputs from a user of the mobile communication device are received, in an embodiment, via a human-machine interface (HMI), comprising, for example, a touch-screen, physical buttons, a camera, and/or a microphone.

In an embodiment, the mobile communication device is a smart phone. The smart phone has UWB capabilities, for example it comprises an integrated UWB transceiver and/or is connected to an UWB transceiver. Alternatively, depending on the embodiment, the mobile communication device is a tablet, laptop computer, smart watch, or other portable electronic device with UWB capabilities.

In an embodiment, the one or more relationship indication(s) indicate where the mobile communication device carried by the user is located relative to the one or more security perimeters of the secure area. The relationship indication(s) are related to one or more relationship(s) between the respective location(s) of the mobile communication device and one or more security perimeters of the secure control area. For example, the relationship indications(s) can indicate that the mobile communication device is located inside a given security perimeter, on the given security perimeter, or outside the given security perimeter. The relationship indication(s) can further indicate that the mobile communication device is located a particular distance from a given security perimeter.

In an embodiment, a time point of receiving the user input in the mobile communication device is associated with the location information relating to the location of the mobile communication device at that same time point. Thereby, the location of the mobile communication device at the time point is associated with whether the mobile communication device is located inside a given security perimeter, on the given security perimeter, or outside the given security perimeter.

The security perimeters are, generally speaking, 2D curves or 3D surfaces which delimit, divide, and/or define particular zones in the secure control area. The security perimeters are, for example, defined as a distance from a particular point, for example a barrier, such as a door or gate. They may additionally or alternatively be defined using a 2D or 3D curve or shape. Depending on the embodiment, a security perimeter has a partition which divides a zone encompassed by the security perimeter into one or more subzones. For example, a security perimeter around a gate has a partition which passes through the gate such that two subzones are formed on either side of the gate. Depending on the embodiment, the security perimeters can be mutually overlapping or not.

The security control system is configured such that the access control devices communicate with authentication devices having UWB transceivers within a transmission range of the access control device and, using the UWB transmissions, determine location information of the authentication devices. Depending on determined location information of the authentication devices, in particular whether the authentication devices are inside a given security perimeter or not, the access control device will perform one or more steps.

In an embodiment, the method further comprises receiving, by the mobile communication device, from the security control system, layout information relating to a physical layout of the one or more security perimeters. In an embodiment, the received layout information is then displayed on a display of the mobile communication device. Optionally, a location of the mobile communication device and/or installation location(s) of the one or more access control devices are also displayed on the display. The layout information is a plan of the physical layout of the one or more security perimeters of the secure control area. The layout information may, however, during configuring, testing, and/or commissioning of the security control system, require refining or adjusting due to particularities of the secure control area such as installation locations of the access control devices deviating from originally planned installation locations, or other changes to the secure control area. A further step includes generating the relationship indications between the one or more locations of the mobile communication device within the secure control area and the one or more security perimeters using the layout information and the one or more user inputs. The one or more user inputs comprise a user confirmation or denial of the relationship indications generated using the layout information. For example, the user confirms or denies that he or she is currently inside a given security perimeter. A further step includes refining the layout information using the generated relationship indications and the user confirmation or denial. The layout information is thereby refined from the layout information as initially received using the location information of the mobile communication device along with the one or more user inputs.

In an embodiment, the received layout information comprises one or more planned positions of the one or more access control devices, the one or more user inputs further including installation location information for at least one of the one or more access control devices. The installation location information includes either a confirmation that an installed position of the at least one access control device in the secure control area corresponds to the planned position, or a correction value relating to a deviation of the installed position to the planned position. Refining the layout information further includes using the installation location information. Thereby, the planned positions of the one or more access control devices are confirmed or corrected using the actual installation position.

In an embodiment, a further step includes determining a tolerance range for the one or more security perimeters, wherein the tolerance range is determined using one or more of the following: a variance in the location information determined at a particular time point, a user input defining a tolerance range, or a tolerance range included in the layout information. A further step includes generating the layout information including a first security perimeter and a second (expanded) expanded security perimeter for each of the one or more security perimeters using the tolerance range. The tolerance range can be used, for example, as a hysteresis zone such that the security perimeter is smaller for a mobile communication device entering the security perimeter than for the mobile communication device exiting the security perimeter. The first security perimeter switches to the second security perimeter once the mobile communication device enters the security perimeter. This ensures that a mobile communication device which is located on the security perimeter or which moves back and forth is not detected as being alternately inside the security perimeter and outside the security in quick succession. Depending on the particular secure control area, the tolerance range is larger or smaller. In particular, this can depend on an expected velocity of movement of users in the secure control area, with larger tolerance ranges being applied for higher expected velocities and lower tolerance ranges being applied with slower expected velocities. Additionally, whether the first security perimeter or the second security perimeter is used can depend on an authorization level of a user carrying an authentication device.

In an embodiment, the method further comprises receiving, by the mobile communication device, the one or more user inputs which further include a relative position of the mobile communication device to a barrier of the security control system. Generating the layout information further using the one or more relative positions included in the one or more user inputs, the layout information further including a partition, which partition divides the security perimeter into two subzones either side of the barrier.

In an embodiment, the method further comprises obtaining, by the mobile communication device, location sensor data from position and/or movement sensors comprised by and/or communicatively connected to the mobile communication device including one or more of: an accelerometer, a GPS receiver, a geomagnetic sensor, or a barometer; and determining the location information and/or generating the layout information further using the location sensor data. The location sensor data is transmitted to the one or more access control devices and associated with the location information relating to the mobile communication device. Thereby, an absolute position of the mobile location device in the secure control area can be determined.

Depending on the embodiment, the steps described above and throughout the present disclosure are executed in one or more devices, in particular in the mobile communication device, the one or more access control devices, and/or a server computer of the security control system.

In an embodiment, generating the layout information is performed by the mobile communication device.

In an embodiment, a further step comprises determining, by the security control system, in particular the server computer of the security control system, the location information of the mobile communication device by processing the signal properties of the UWB transmissions, and transmitting, from the security control system to the mobile communication device, the location information. The location information is transmitted either using UWB transmissions or another form of wireless communication, for example using a WLAN connection or a mobile radio network.

In an embodiment, the method comprises the step of transmitting the one or more user inputs to the security control system, and determining, by the security control system, the location information of the mobile communication device by processing the signal properties of the UWB transmissions, upon receipt of the one or more user inputs, respectively. The method further comprises the step of generating, by the security control system, the layout information using the location information.

In addition to a method for configuring the security control system, the present invention also relates to a mobile communication device for configuring a security control system of a secure access area, the mobile communication device having a communicative connection to an UWB transceiver and comprising a processor and a memory, and wherein the processor is configured to perform one or more of the method steps for configuring the security control system as described above.

In addition to the method and the mobile communication device for configuring the security control system, the present invention also relates to a computer program product comprising computer-executable instructions which, when executed by a processor of a mobile communication device, causes the mobile communication device to carry out one or more of the method steps for configuring a security control system of a secure access area as described above.

Additionally, the present invention also relates to an access control device of a security control system of a secure access area, the access control device comprising an ultra-wideband UWB transceiver, a processor, and a memory, and wherein the processor is configured to perform one or more of the method steps for configuring the security control system as described above.

In an embodiment, the access control device is communicatively connected to one or more barriers and is configured to control access through the one or more barriers according to the layout information of the one or more security perimeters associated with the one or more barriers.

Additionally, the present disclosure relates to a system comprising a security control system of a secure access area and a mobile communication device, the security control system comprising an access control device as described above wherein the mobile communication device and the access control device are configured to perform one or more of the method steps for configuring the security control system as described above.

The present disclosure relates to configuring a security control system, in particular for access control. It is foreseen, however, that the present disclosure may also be applied for configuring other systems in other technical areas which feature mobile devices that communicate using UWB transmissions. For example, the present disclosure may be used for configuring a system for providing location based services, such as for providing access to physical assets and/or digital assets only when a mobile device is located inside a perimeter. In another example, the present disclosure may be used for configuring a system for asset tracking, such as in logistics, in which particular processes are initiated when a mobile asset with UWB capabilities crosses a security perimeter. In another example, the present disclosure may be used for configuring a smart home system, in which particular processes or functionalities depend on a location of the mobile device in a building. In another example, the present disclose may be used for configuring a payment system in which particular payment processes, in particular initiation of a payment authorization, depend on a location of a mobile device, in particular depend on a close proximity of the mobile device to a payment terminal.

BRIEF DESCRIPTION OF THE DRAWINGS

The herein described disclosure will be more fully understood from the detailed description given herein below and the accompanying drawings which should not be considered limiting to the disclosure described in the appended claims. The drawings in which:

DETAILED DESCRIPTION OF EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
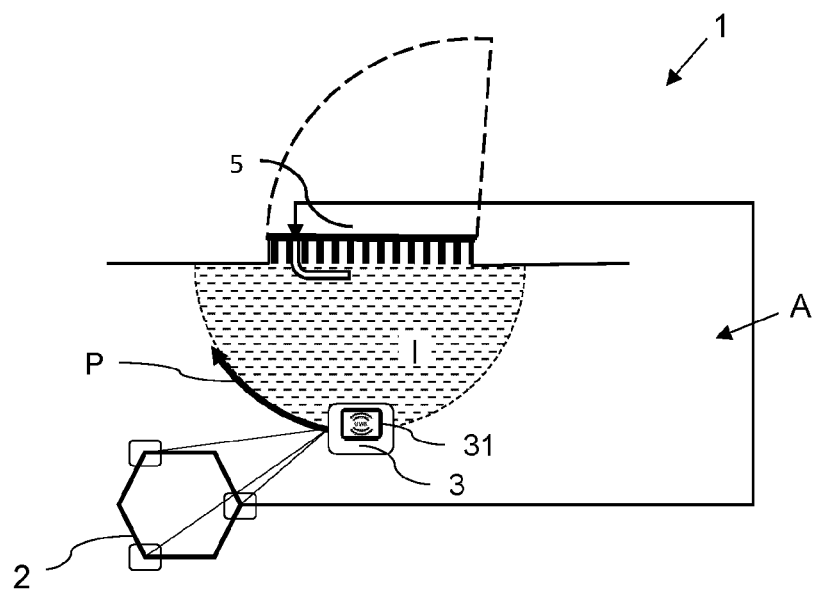
FIG. 1: shows a highly schematic top view of a first embodiment of the security control system and a security perimeter in a secure control area according to the present invention.

FIG. 1 shows a highly schematic top view of a first embodiment of the security control system 1 according to the present invention. The security control system 1 comprises an access control device 2 and a barrier 5 arranged within a secure control area A, the barrier being communicatively connected to the access control device 10. The barrier 5 may be a door, gate, turnstile, parking gate, elevator door, or other device which limits access to a user, either on foot or in a vehicle. Furthermore, the barrier 5 must not be a physical barrier preventing access, but may—according to embodiments of the present disclosure—also comprise indication means such as audible (such as a siren which is activated if passage is detected despite access not being granted) and or visual means (such as a traffic light).

The secure control area A may be an entrance area of a building, a hallway, a control section of a public transportation center, such as a subway station, an airport or the like. At least one security perimeter I is associated with the barrier 5. As illustrated, the access control device 2 may be located remote from the barrier 5 and/or from the security perimeter I. According to embodiments of the present disclosure, the security perimeter I is defined on one or both sides of the barrier 5. The security perimeter I defines a zone in which the access control device 2 performs one or more functions or steps, in particular relating to access control. For example, the access control device 2 is configured to authenticate an authentication device when the authentication device is within the security perimeter I. The security perimeter I should be large enough that a user having an authentication device on his or her person does not have to wait very long for the authentication to take place and for the user to be granted access through the barrier 5. On the other hand, the security perimeter I should be small enough to prevent unauthorized access, for example that by another, unauthorized user, gaining access through the barrier 5 merely because an authorized user is standing nearby.

The size and shape of the security perimeter I depends on many factors, including the type and size of barrier 5 used and whether the users are approaching the barrier slowly or quickly. Further, the floor plan and specific layout of the area surrounding the barrier 5 plays a role in the precise physical layout of the security perimeter I.

It is therefore advantageous that the security perimeter I can be quickly and easily configured by a user with a mobile communication device 3, in particular during commissioning of the security control system 1, as well as calibrating it for optimal performance. Further, as a planned position of the access control device 2 during planning of the security control system 1 does not always correspond precisely to the installed position of the access control device 2, and because the precise layout of the secure control area A can influence UWB transmissions, in particular through signal reflections, it is advantageous to perform a calibration of the security control system 1 which involves generating layout information related to a physical layout of the security perimeter I based on real world data. This is done, according to the present invention, by using a mobile communication device 3 having an UWB communication module 31 whose location is recorded by the access control device 2, while the mobile communication device 3, held by a user, is moved around the secure control area A.

The mobile communication device 3 is a portable electronic system such as a smart phone, smart watch, tablet, laptop, or similar device. The mobile communication device 3 contains a processor (not shown), such as a SoC (System on a Chip), and an UWB communication module 31. The mobile communication device 3 further contains a memory and a battery, along with other required hardware components. The UWB communication module 31 is configured for establishing an UWB transmission with an access control device 2 of the security control system 1. According to further embodiments disclosed herein, the mobile communication device 3 further comprises a wireless communication module for data transmission to a respective interface of the communication module 24 of the security control system 1, in particular the access control device 2 using an alternative communication technology (as compared to UWB) such as Bluetooth Low Energy (BLE), a Wireless Local Area Network (WLAN), Zig Bee, Radio Frequency Identification (RFID), Z-Wave, and/or Near Field Communication (NFC). Depending on the embodiment, the mobile communication device 3 is configured to exchange data with the security control system 1 indirectly via an intermediary system and/or communication network, for example comprising a cloud-based server computer 6 (not shown) and the Internet. According to further embodiments disclosed herein, the mobile communication device 2 also contains provisions for wired communication via a socket such as USB, Micro-USB, USB-C, Lightning, or 3.5 mm jack, for use in a wired communication using an appropriate protocol for wired transmission.

The user (not shown) carrying the mobile communication device 3, or having the mobile communication device 3 on their person, moves along a path P while the access control device 2 records the location(s) of the mobile communication device 3. The user provides user inputs, as described below in more detail, the user inputs comprising relationship information which is used to generate or refine the physical layout of the security perimeter I.

Figure 2:
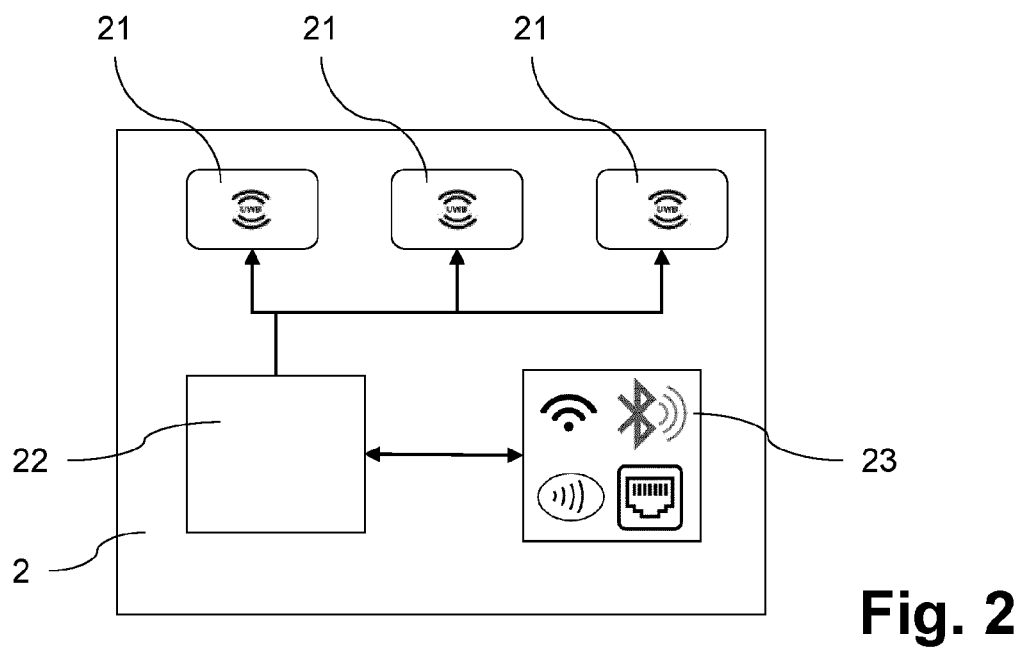
FIG. 2: shows a schematic block diagram of an access control device according to the present invention.

FIG. 2 shows a schematic block diagram of a first embodiment of an access control device 2 according to the present invention, comprising a plurality of UWB transceiver(s) 21 and a processor 22.

The UWB transceivers 21 are configured to execute UWB transmissions with the mobile communication device 3 and comprise an antenna and circuitry for UWB signal transmission and reception. The processor 22 is configured to determine the physical location(s) of the mobile communication device 3 within the secure control area A by processing signal properties of the UWB transmissions, in particular a time of reception of the UWB transmissions. The physical location(s) of the mobile communication device 3 is determined in particular as 2-dimensional or 3-dimensional position(s), in particular as 2-dimensional or 3-dimensional coordinate(s), within the secure control area A.

The access control device 2 is configured to determine the physical location(s) of the mobile communication device 3 within the secure control area A by multilateration (e.g. trilateration) and/or multiangulation (e.g. triangulation) using the plurality of UWB transmissions by the plurality of UWB transceiver(s) 21 of the access control device 2.

Multilateration and/or multiangulation relies on determining the distances and/or angles between the mobile communication device 3 and the plurality of UWB transceiver(s) 21 of the access control device 10. Determining the distances between the mobile communication device 3 and the plurality of UWB transceiver(s) 21 based on the propagation time of the UWB transmissions comprises measuring the time required for a signal to travel from the UWB transceivers 21 to the UWB communication module 31 of the mobile communication device 3; and/or the time required for a signal to travel from the UWB communication module 31 of the mobile communication device 3 to the UWB transceiver 21. In a particular embodiment, a time difference is used as a basis for determining the distances, as it is more secure against spoofing attacks, wherein a third party may use a radio relay device to gain unauthorized access to a location or system in a so-called "relay-attack". Depending on the embodiment, the time difference is a "one-way time-of-flight" time difference between the UWB transceivers 21 sending a signal and the mobile communication device 3 receiving the signal, or a "round-trip time-of-flight" time difference, in which a second transmission takes place from the UWB communication module 31 of the mobile communication device 3 to the UWB transceivers 21 either prior to, or after, the first transmission of the signal. In the "one-way time-of-flight" scenario, the UWB transceivers 21 and the UWB communication module 31 of the mobile communication device 3 need to be provided with tightly synchronized clocks for accurately determining the distances. In the latter case of a "round-trip time-of-flight" calculation, there is stored, either in the mobile communication device 3 or the UWB transceivers 21, an accurate representation of the processing time, i.e. the time it takes between the reception of an UWB transmission and the sending of a response UWB transmission, which processing time allows for accurately determining the distances. Measurement of a time required for the signal to travel from the UWB transceivers 21 to the UWB communication module 31 of the mobile communication device 3 and back "round-trip time-of-flight" is advantageous as it does not require the precise synchronization of clock signals of the ultra-wideband transceivers 21 and the mobile communication device 3.

The access control device 2 further comprises a communication module 23 which provides one or more further communication interfaces for wired and/or wireless transmission means. For example, the access control device 2 comprises an Ethernet interface, a Bluetooth interface, a WLAN interface, and/or a wireless radio network interface.

Figure 3:
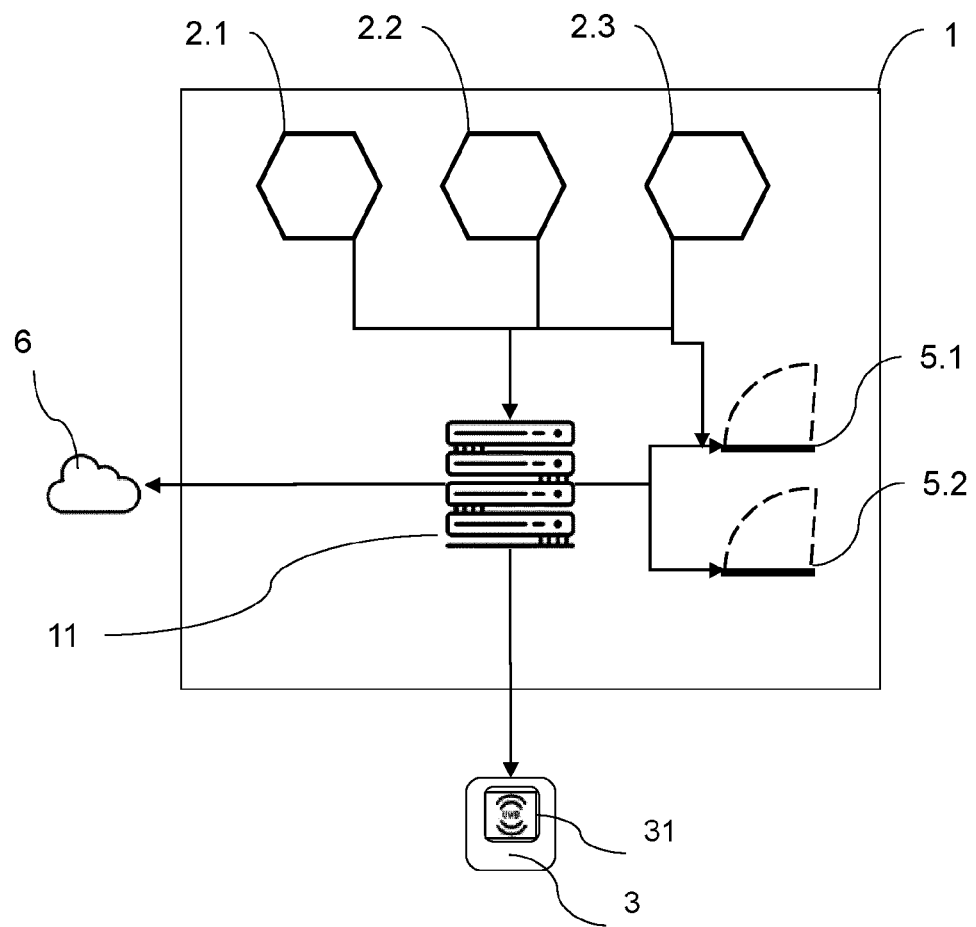
FIG. 3: shows a highly schematic block diagram of a further embodiment of the security control system according to the present invention, comprising a plurality of access control devices and barriers.

FIG. 3 shows a highly schematic security control system 1 comprising a number of access control devices 2.1, 2.2, 2.3, which are communicatively connected to a server computer 11. The server computer 11 is located on site, e.g. in the same building or at the same installation site as the access control devices 2.1, 2.2, 2.3. Depending on the embodiment, the server computer 11 is instead located remotely. The server computer 11 is connected to a cloud-based server computer 6, for example via the Internet.

Depending on the embodiment, one or more steps and/or functions described as being performed by the security control system 1, in particular the server computer 11, can be executed remotely in the cloud-based server computer 6. The security control system 1 further comprises one or more barriers 5.1, 5.2, which are communicatively connected to the server computer 11 and/or the access control devices 2.1, 2.2, 2.3. The security control system 1 is further wirelessly connected to the mobile communication device 3. As depicted in the figure, the server computer 11 is wirelessly connected to the mobile communication device 3. The skilled person is aware that any number of intermediary devices or intermediary networks may lie between the server computer 11 and the mobile communication device 3, for example network routers, switches, and wireless access points. Depending on the embodiment, the mobile communication device 3 is communicatively connected to the server computer 11 via the access control devices 2.1, 2.2, 2.3. The mobile communication device 3 may also be connected to the server computer 11 via a mobile radio network, e.g. GSM, UTMS, 4G, or the like.

Figure 4:
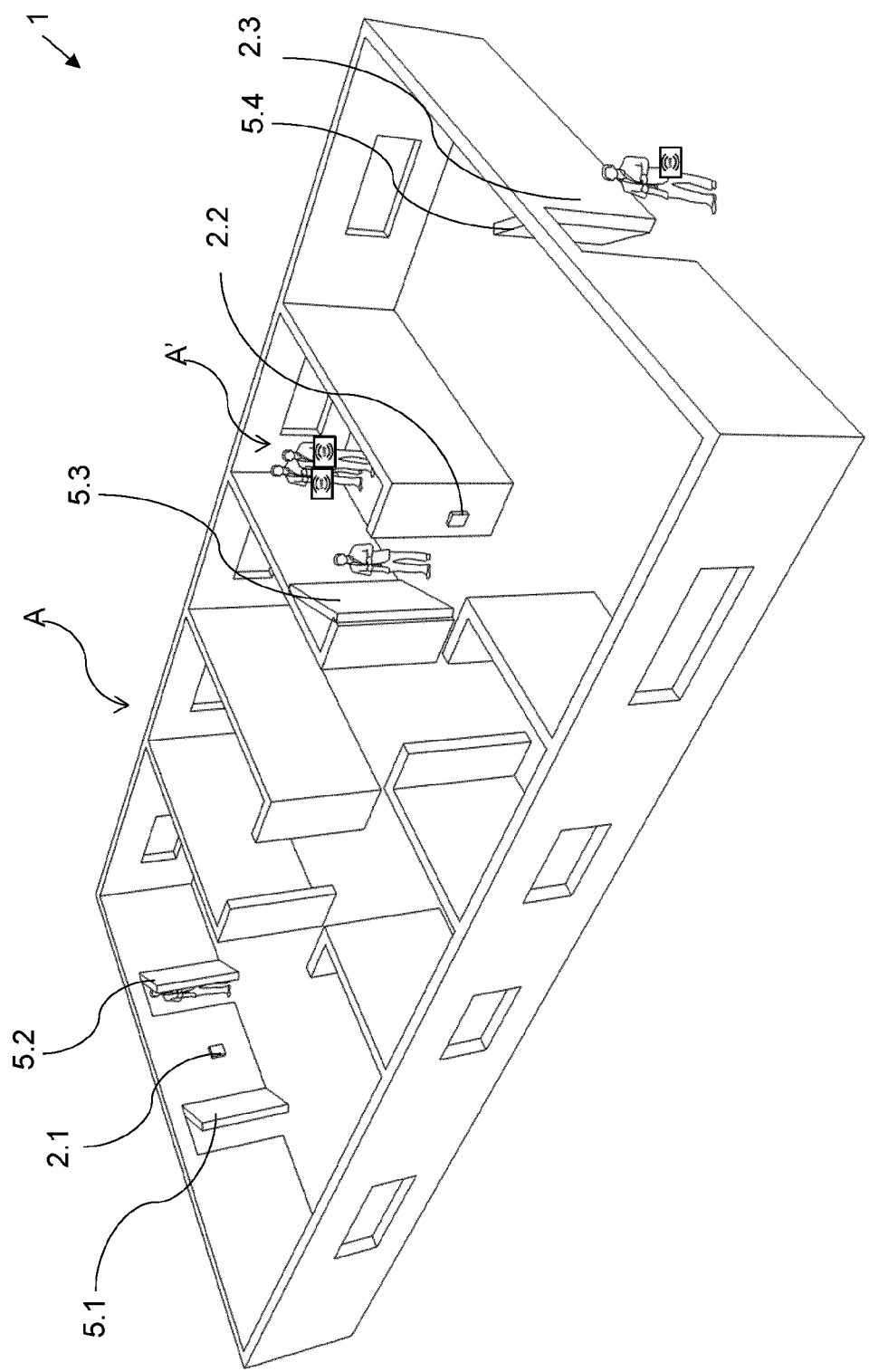
FIG. 4: shows a highly schematic perspective view of a secure control area according to the present invention.

FIG. 4 shows a perspective view of a first access control area A which comprises a floor of a building having multiple barriers 5.1, 5.2, 5.3 for entry (illustrated as doors in this figure), along with a second access control area A' separated from the first access control area by a barrier 5.4. Security perimeters are not shown in this figure. Some barriers share an access control device 2, for example barriers 5.1, 5.2 are both arranged near the access control device 2.1. Barriers 5.3 and 5.4, on the other hand, each have a single associated access control device 2.2 and 2.3, respectively. The access control devices 2.1, 2.2, 2.3 are shown installed on walls of the building, however they can also be arranged on the ceiling, or in the barriers 5.1, 5.2, 5.3 themselves, for example. Users are depicted carrying authentication devices having UWB transceivers, users being shown outside the first access control area A, entering the access control area A, and inside the access control area A'. During configuration of the security control system 1, the security perimeters I, II, III, IV are generated or refined depending on how close two barriers 5.1, 5.2, 5.3 are situated to each other, such that access control is performed only once it has been established that a given user with an authentication device is approaching a particular barrier 5.1, 5.2, 5.3.

Figure 5:
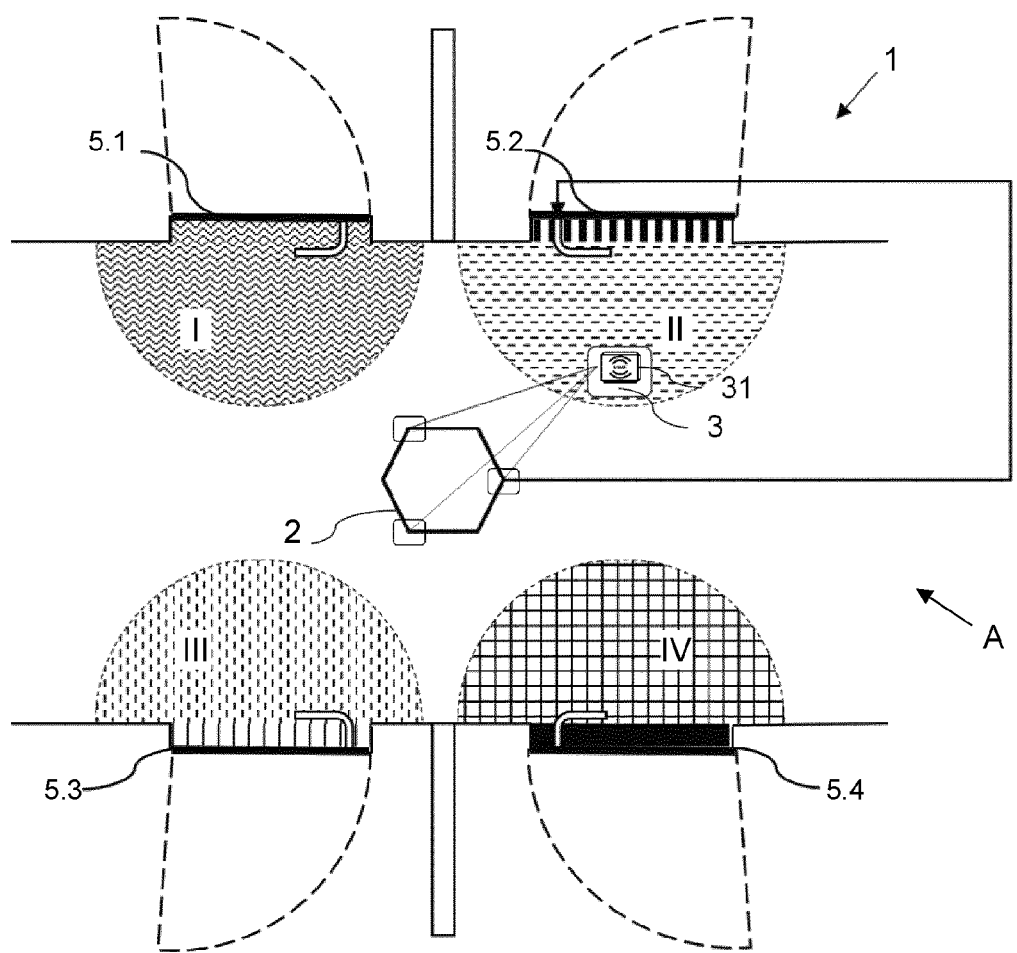
FIG. 5: shows a highly schematic top view of a further embodiment of the security control system according to the present invention, comprising a plurality of barriers having a plurality of security perimeters associated thereto.
Figure 6:
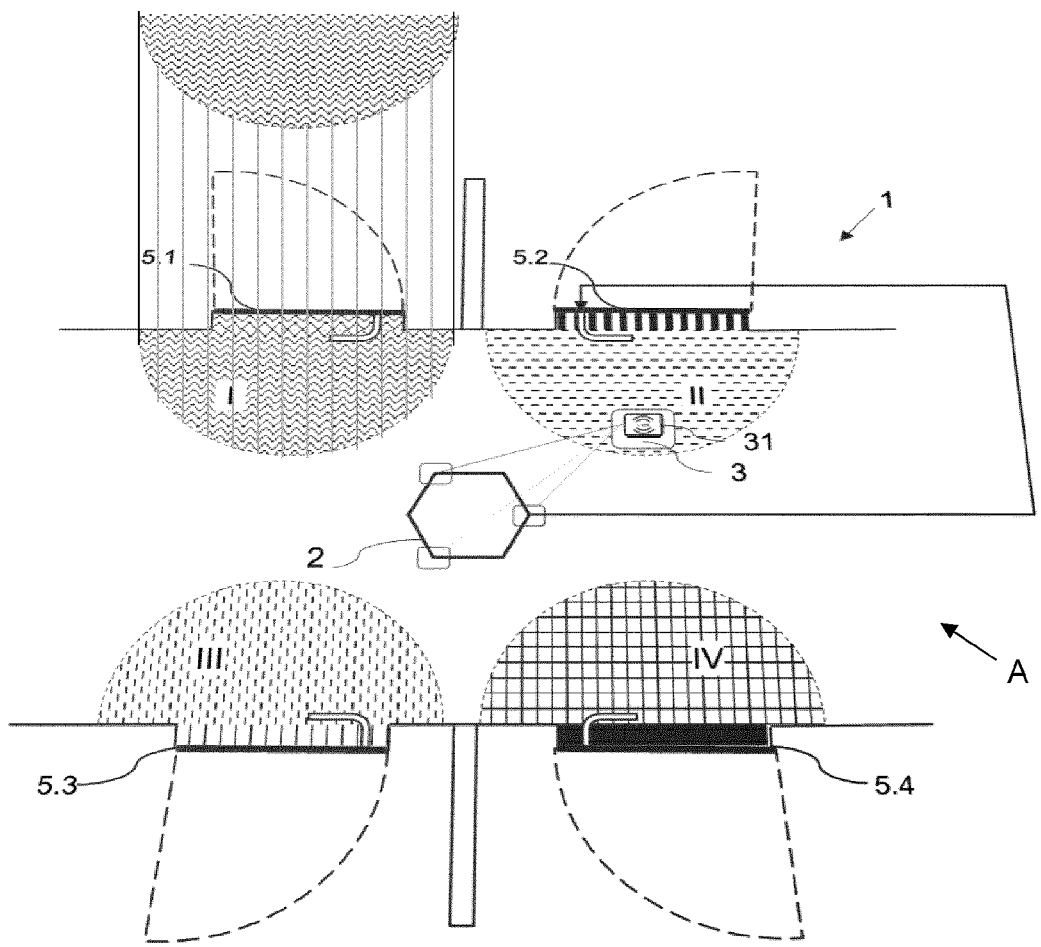
FIG. 6: shows a highly schematic perspective view of an embodiment of the security control system according to the present invention, comprising a plurality of barriers having a plurality of security perimeters associated thereto.

FIGS. 5 and 6 show a schematic top down and perspective view, respectively, of an access control area A with multiple security perimeters I, II, III, IV associated with multiple barriers 5.1, 5.2, 5.3, 5.4, respectively. A single access control device 2 is arranged in the access control area A, which access control device 2 has multiple UWB transceivers 21 such that location information of a mobile communication device 3 carried by a user is determined, the location information including, for example, a distance from the access control device 2, an angle with respect to an orientation of the access control device 2 (e.g. an azimuthal angle), a 2D location, and/or a 3D location. The location information enables the security control system 1 to establish a position of the mobile communication device 2 within the access control area A, in particular in relation to the barriers 5.1, 5.2, 5.3, 5.4. During configuring of the security control system 1, the user of the mobile communication device 3 walks around the secure control area A while location information of the mobile communication device 3 is recorded.

In FIG. 6, the security perimeter I in particular is shown as extending from a semi-circular curve on the floor of the building straight up, forming a security "curtain" around the barrier 5.1.

Figure 7:
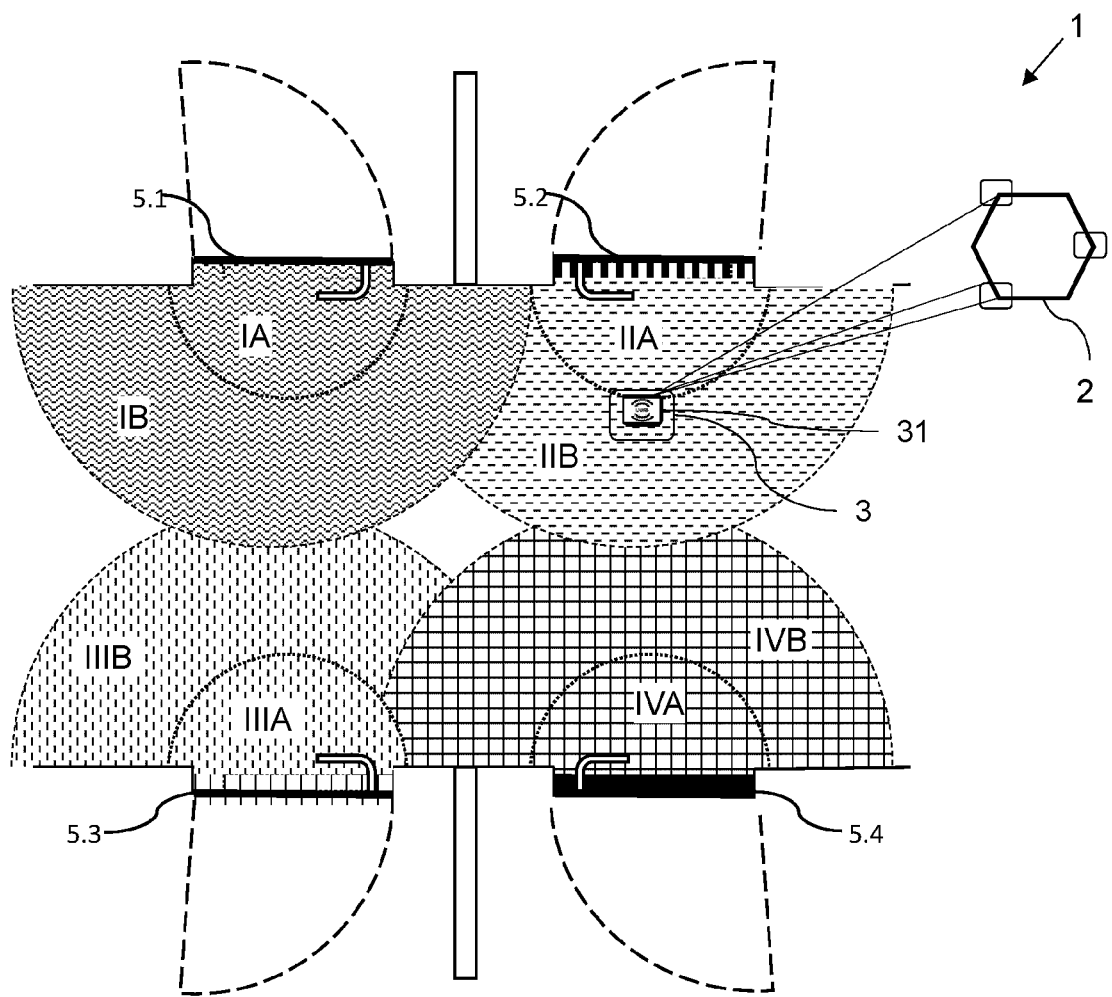
FIG. 7: shows a highly schematic top view of an embodiment of the security control system according to the present invention, comprising a plurality of barriers having a plurality of security perimeters associated thereto, each barrier having a security perimeter with a tolerance range.

FIG. 7 shows a schematic top down view of a secure control area A in much the same way as FIG. 5, however both a first security perimeter IA, IIA, IIIA, IVA, and second security perimeter IB, IIB, IIIB, IVB are associated with each of the barriers 5.1, 5.2, 5.3, 5.4. In particular, the first security perimeter IA, IIA, IIIA, IVA is smaller than an (expanded) second security perimeter IB, IIB, IIIB, IVB. The first security perimeters IA, IIA, IIIA, IVA are defined for administrators of a secure control area A—who are frequently present in multiple security perimeters without the intention to gain access through each and every barrier. The second security perimeters IB, IIB, IIIB, IVB are defined for guests/regular users—who have a clear intention to gain access through the barrier they are approaching. The first security perimeter IA, IIA, IIIA, IVA and the second security perimeter IB, IIB, IIIB, IVB are, in an embodiment, also used as a hysteresis zone such that the first security perimeter IA, IIA, IIIA, IVA is used for users approaching a given barrier 5.1, 5.2, 5.3, 5.4 and the second security perimeter IB, IIB, IIIB, IVB is used for users moving away from the given barrier 5.1, 5.2, 5.3, 5.4.

Figure 8:
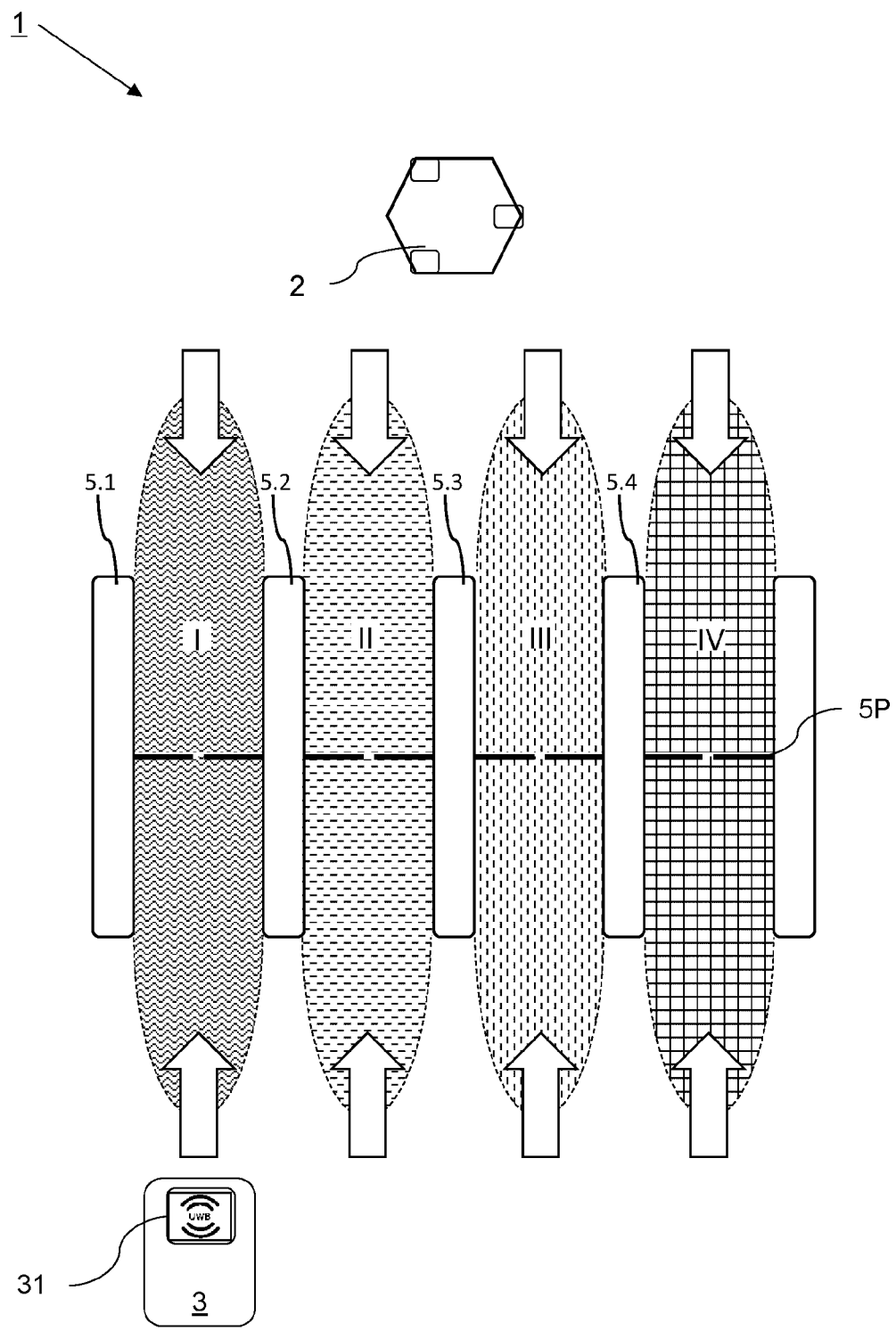
FIG. 8: shows a highly schematic top view of a further embodiment of the security control system according to the present invention, comprising a plurality of barriers and security perimeters associated thereto, the security perimeters having a partition.
Figure 9:
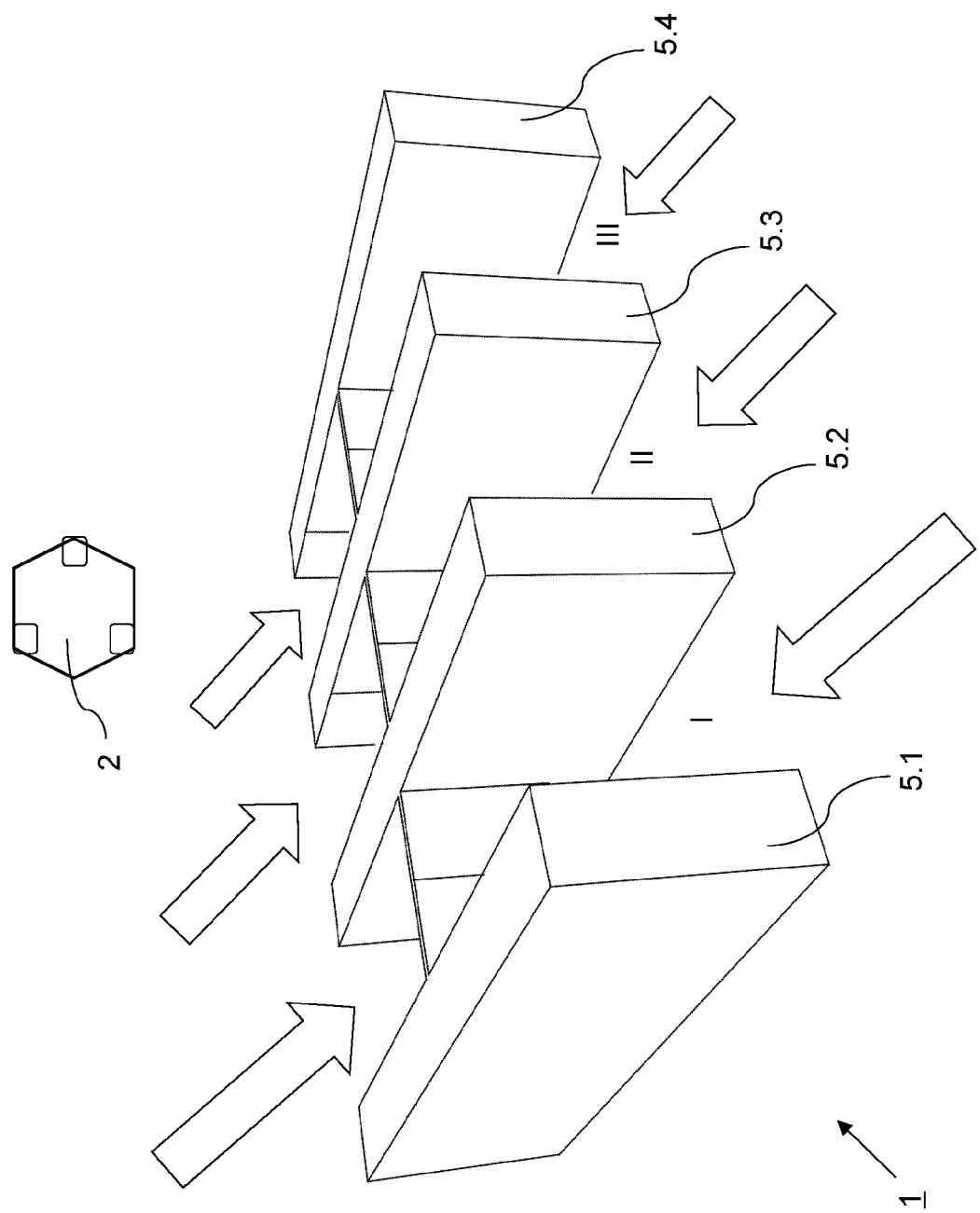
FIG. 9: shows a highly schematic perspective view of an embodiment of the security control system according to the present invention, comprising a plurality of barriers, security perimeters being associated with the one or more barriers.

FIGS. 8 and 9 shows a schematic top down view, and a schematic perspective view, respectively, of a plurality of barriers 5.1, 5.2, 5.3, 5.4 arranged next to each other, such as may be found at entrances to large office buildings, transportation facilities such as railway or subway stations, large venues for sports or concerts, or airport boarding pass control. The security perimeter IA, IIA, IIIA, IVA associated with each barrier 5.1, 5.2, 5.3, 5.4 has a partition 5P which is used to partition the security perimeter IA, IIA, IIIA, IVA into two sub-zones. The security control system 1 determines whether a user with an authentication device is on one side of the barrier 5.1, 5.2, 5.3, 5.4 or another depending on whether the authentication device is detected as being in a first sub zone or in a second sub-zone.

Figure 10:
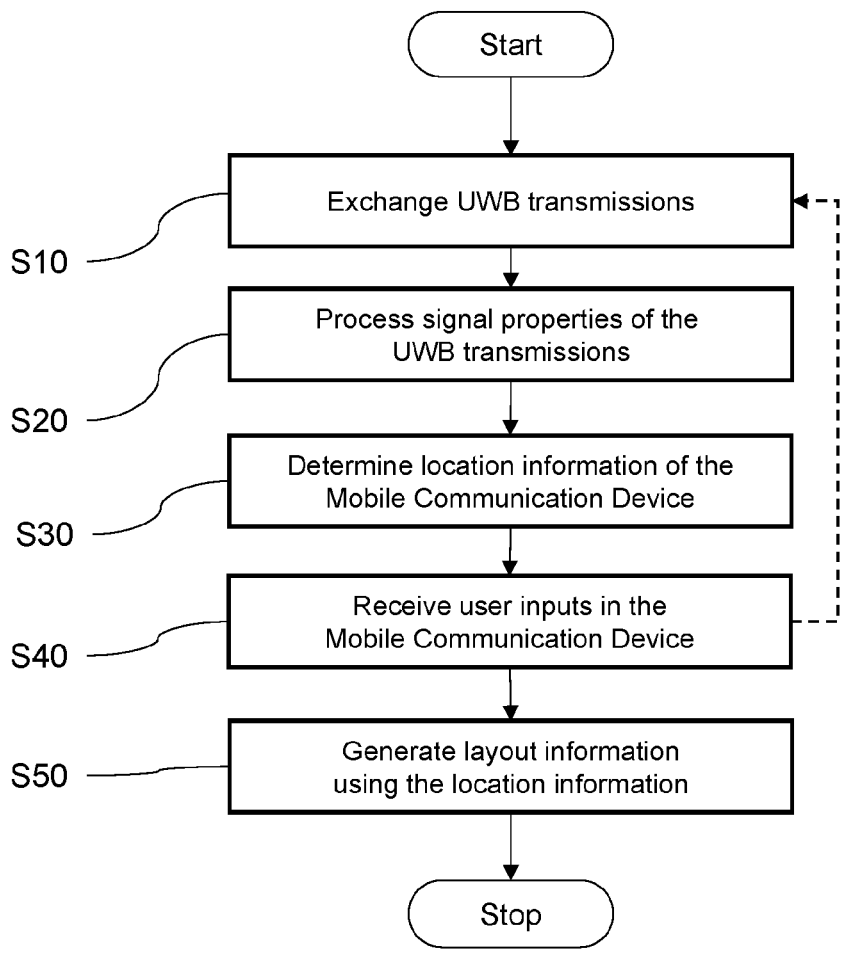
FIG. 10: shows a flow chart illustrating a sequence of steps for configuring the security control system according to an embodiment of the present invention.
Figure 11:
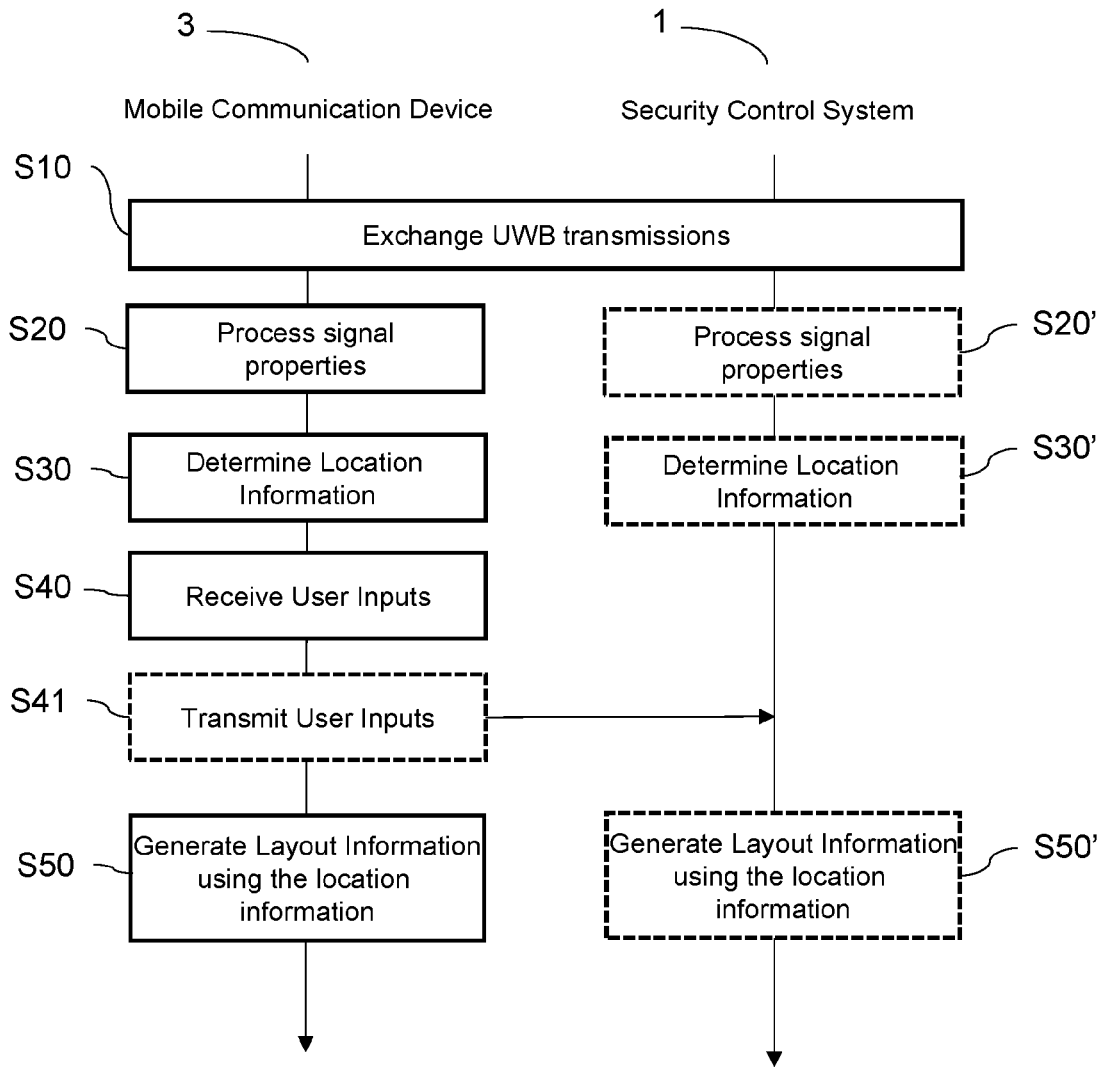
FIG. 11: shows a flow chart illustrating a sequence of steps for configuring the security control system according to an embodiment of the present invention.
Figure 12:
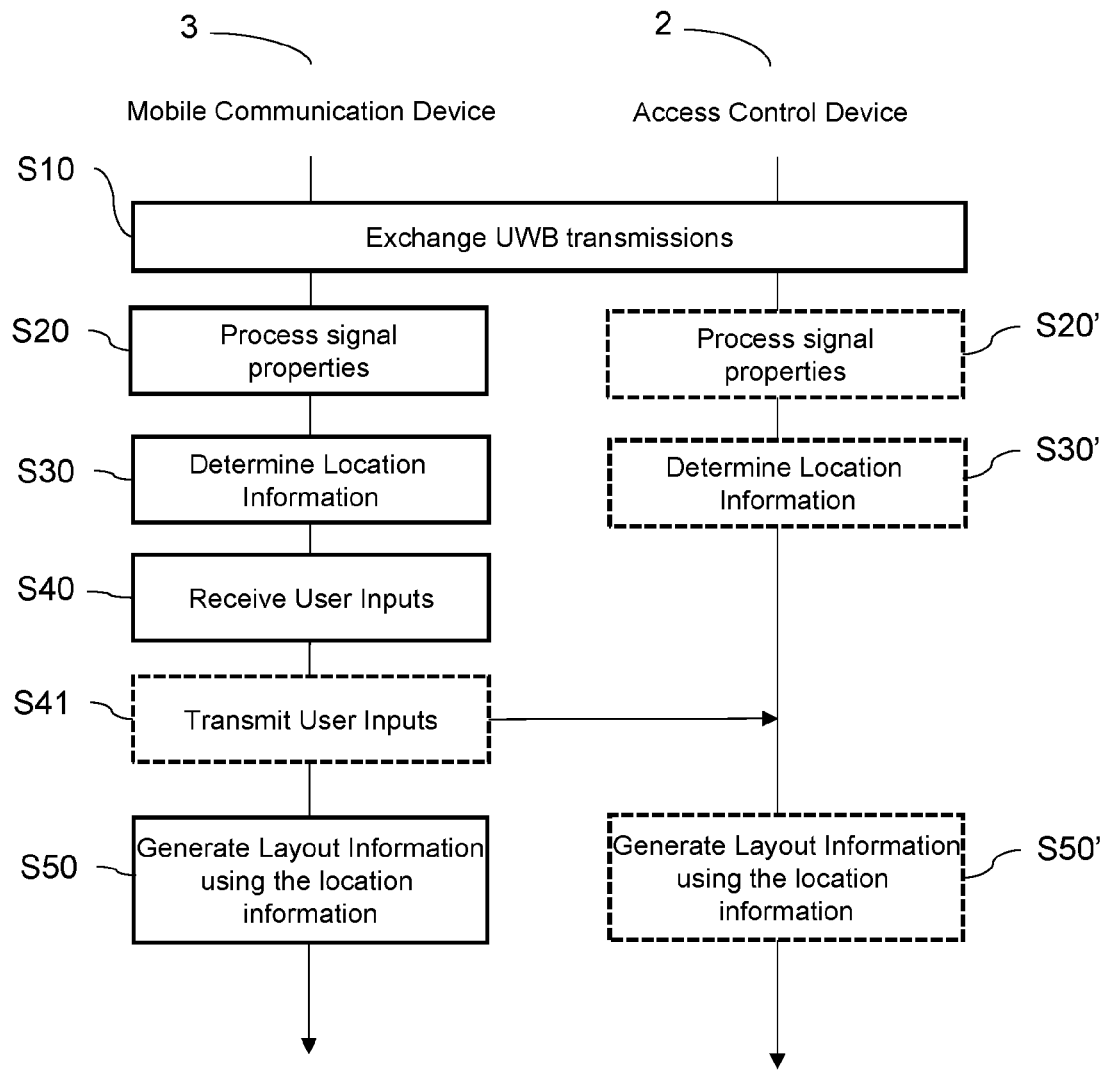
FIG. 12: shows a flow chart illustrating a sequence of steps for configuring the security control system according to an embodiment of the present invention.
Figure 13:
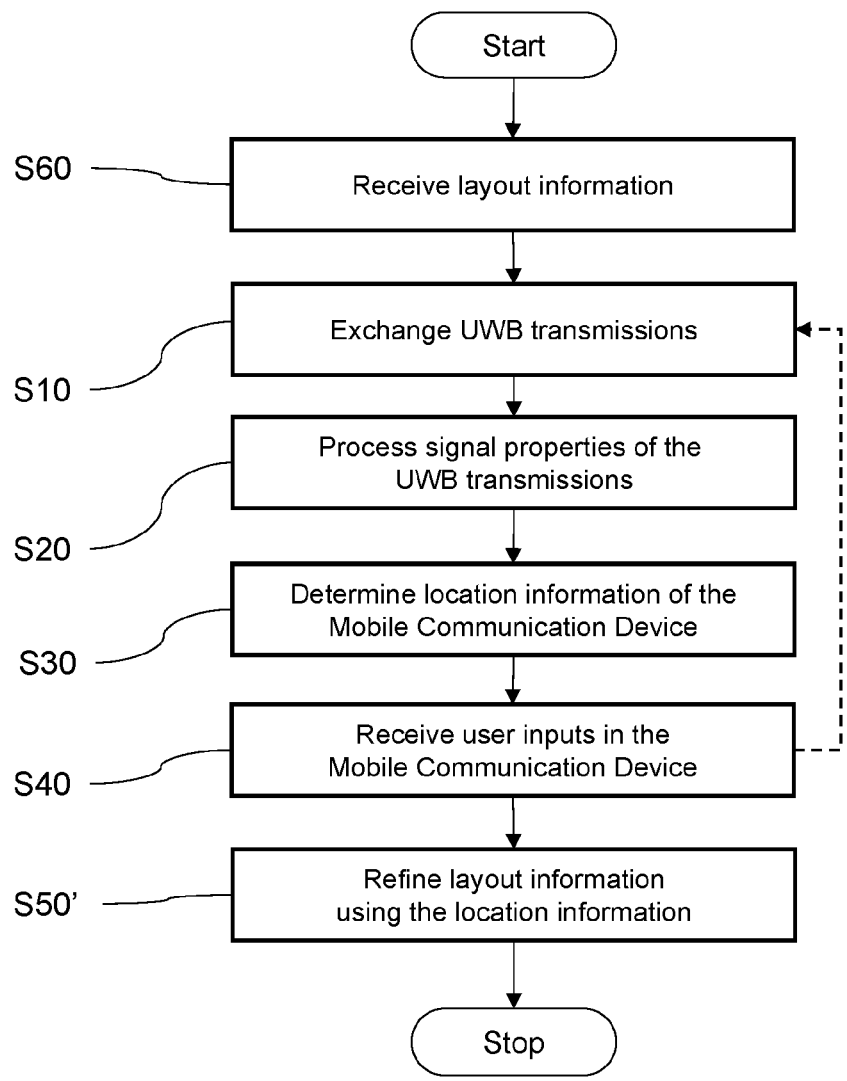
FIG. 13: shows a flow chart illustrating a sequence of steps for configuring the security control system according to an embodiment of the present invention.

FIGS. 10 to 13 show flow charts illustrating a sequence of steps for generating layout information relating to the physical layout of the security perimeters IA, IIA, IIIA, IVA. In FIGS. 10 and 13, the sequence of steps is illustrated without reference to which particular device executes each step. Some of the steps are executed in a particular device, such as the mobile communication device 3 or the access control device 2. However, otherlay steps are, depending on the embodiment, executed in one or more of the following: the mobile communication device 3, the access control device 2, the server computer 11 of the security control system 1, or the cloud-based server computer 6. It is also clear to the skilled person that the order of at least some of the steps as described can be rearranged without deviating from the scope of the invention.

In FIG. 10, in a first step S10, the mobile communication device 3 and the access control device 2 exchange UWB transmissions. As described above, this involves one or more UWB transmissions sent between the mobile communication device 3 and the access control device 2. Depending on the embodiment, either the mobile communication device 3 or the access control device 2 initiates the exchange of UWB transmissions by sending a first UWB transmission. In an embodiment where multiple access control devices 2 are within communication range of the mobile communication device 3, the multiple access control devices 2 exchange UWB transmissions with the mobile communication device 3. Depending on the embodiment, the access control device(s) have a number of UWB transceivers 21, and exchanging UWB transmissions between the mobile communication device 3 and the access control device 2 comprises each UWB transceiver 21 of the access control device 2 transmitting and/or receiving one or more UWB transmissions to and/or from, respectively, the mobile communication device 3.

In a step S20, signal properties of the UWB transmissions are processed. In particular, time points of transmission and reception of UWB transmissions between the mobile communication device 3 and the access control device 2, or vice versa, are processed, as previously described, to determine one or more distances between the access control device 2 and the mobile communication device 3, in particular, a distance between each UWB transceiver 21 of the access control device 2 and the mobile communication device 3 is determined.

In step S30, location information of the mobile communication device 3 is determined. Using trilateration, for example, the distances determined in step S20 are used to determine location information of the mobile communication device 3. The location information comprises one or more of the following: a distance between the access control device 2 and the mobile communication device 3, an angle between the access control device 2 and the mobile communication device 3, in particular an azimuthal angle between an azimuthal axis of the access control device, or another pre-determined axis, and the mobile communication device 3, 2D coordinates relating to the location of the mobile communication device 3, or 3D coordinates relating to the location of the mobile communication device 3. The location information is, in an embodiment, relative to an installed position of the access control device 2. If the installed position of the access control device 2 is known, the location information can also be translated such that the location information relates the mobile communication device 3 to the layout information of secure control area A, for example enabling the mobile communication device 3 to be located on a floor plan. Further, if the position of the barrier 5 is known, the location information can also be translated such that the location information relates the mobile communication device 3 to the barrier 5, for example indicating a distance between the mobile communication device 3 and the barrier and/or indicating on which side of the barrier 5 the mobile communication device 3 is located.

The location information of the mobile communication device 3 is determined on a continual basis and recorded over a duration of time, such that, as the user of the mobile communication device 3 moves around the secure area A, the path P of the mobile communication device 3 is recorded.

In step S40, the user enters user inputs into the mobile communication device 3. The user inputs are recorded on a continual basis, much like the location information is also recorded on a continual basis, while the user with the mobile communication device 3 moves around the secure control area A. The user inputs provide relationship indications between a current location of the mobile communication device 3 and one or more security perimeters I, II, III, IV of the secure control area A. For example, the relationship indications can indicate that the user is currently located on a particular security perimeter I, II, III, IV, that the user is currently walking along a path P defining an edge of the particular security perimeter I, II, III, IV, that the user is currently inside the particular security perimeter I, II, III, IV, that the user is currently outside the particular security perimeter security perimeter I, II, III, IV, or is located a certain distance from the security perimeter I, II, III, IV. For example, the mobile communication device 3 receives a start user input from the user indicating a start of the path P and an end user input indicating an end of the path P.

In an embodiment, the user inputs provide further relationship indications relating to the secure control area A and the security control system 1. For example, the user can stand next to the barrier 5 and provide these relationships indications in a user input. This enables for determining a relative position of the access control device 2 to the barrier 5, which is particularly advantageous if a precise installed location of the access control device 2 is not known. In another example, the user inputs allow the user to indicate that he or she is, or will be, approaching the barrier 5, moving through the barrier, and/or departing from the barrier.

In an embodiment, the access control device 2 records the location(s) of the mobile communication device 3, in particular the location(s) of the mobile communication device 3 at those time points when the mobile communication device 3 receives a user input. Those particular location(s) are determined in real-time by the mobile communication device 3 transmitting a message to the access control device 2 upon receiving a user input.

In step S50, layout information relating to a physical layout of the security perimeters I, II, III, IV is generated using the recorded location information and the recorded relationship indications. In particular, the recorded location information and the recorded relationship indications are associated with each other such that a time point at which a relationship indication is received in a user input is associated with location information of the mobile communication device 3 at the same, or a similar, time point.

In an embodiment where the user provides the start user input and an end user input, the layout information is generated by using only the recorded location(s) of the mobile communication device 3 in between a time point of the start user input and a time point of the end user input.

The location information, which relates to location(s) of the mobile communication device 3, along with the relationship indications are used to generate the layout information relating to the physical layout of the security perimeter I, II, III, IV. The layout information is generated using, for example, a clustering algorithm or a segmentation algorithm such that the generated security perimeter I, II, III, IV substantially segregates a first set of location(s) of the mobile communication device 3 associated with a first set of user inputs indicating that the user is inside the security perimeter I, II, III, IV with a second set of location(s) of the mobile communication device 3 associated with a second set of user inputs indicating that the user is outside the security perimeter I, II, III, IV. In another example, location information related to a time interval in which one or more user inputs indicate that the user was moving along the path P intended to be the security perimeter I, II, III, IV is used to generate the security perimeter I, II, III, IV. A smoothing function may be used to remove unevenness or variability in the location information.

In FIGS. 11 and 12, the sequence of steps is executed by the mobile communication device 3 and the security control system 1, and between the mobile communication device 3 and the access control device 2, respectively.

In FIG. 11, step S10 UWB transmissions are exchanged between the mobile communication device 3 and the security control system 1, in particular between the mobile communication device 3 and the access control device 2 as described above in more detail. In step S20, the signal properties of the UWB transmissions are processed in the mobile communication device 3. The signal properties of the UWB transmissions can also be processed in the security control system 1 in an alternative step S20'. The location information is determined, in step S30, in the mobile communication device 3. The location information can also be determined in the security control system 1 in an alternative step S30'. In step S40, the user inputs are received in the mobile communication device 3. In an optional step S41, the user inputs are transmitted from the mobile communication device 3 to the security control system 1. In step S50, the layout information is generated in the mobile communication device 3 using the location information and the user inputs. In an alternative step S50', the layout information is generated in the security control system 1 using the location information and the user inputs. The steps described in relation to FIG. 11 executed in the security control system 1 are executed in the server computer 11 of the security control system. Optionally, some or all of these steps are instead executed in the cloud-based server computer 6 which is connected to the security control system 1.

FIG. 12 shows a similar flow chart as FIG. 11, however the steps executed by the security control system 1 in FIG. 11 are executed specifically, in FIG. 12, by the access control device 2. Thereby, generating the security perimeter(s) I, II, III, IV does not require the access control device 2 to be connected to the rest of the security control system 1, in particular during configuring, which makes the commissioning of the security control system 1 more flexible.

FIG. 13 shows a flow chart illustrating a sequence of steps for refining the layout information, in particular refining the physical layout of the security perimeter(s) I, II, III, IV. Steps S10, S20, S30, and S40 are the same as described above in relation to FIG. 10. Additionally, in a first step S60, layout information is received in the mobile communication device 3. The layout information is received in the mobile communication device 3 and displayed on a display of the mobile communication device prior to the user entering user inputs regarding the security perimeter I, II, III, IV. In particular, the layout information is stored in and received from either the server computer 11 of the security control system 1 or from a cloud-based server computer 6 (as shown in FIG. 3). The layout information comprises a preliminary physical layout of the security perimeter I, II, III, IV which includes, for example, a schematic diagram of the secure control area A. The user then, guided by the received layout information, moves around the secure control area A with the mobile communication device 3, providing user inputs indicating a current relationship of the location of the mobile communication device 3 to the security perimeter I, thereby enabling a configuration, calibration, and/or refinement of the physical layout of the security perimeter I as comprised in the layout information. Further, the user receives, in an embodiment, via the display of the mobile communication device 3, an indication of the location of the mobile communication device 3 in the secure control area A, in particular a location in relation to the preliminary physical layout of the security perimeter(s) I, II, III, IV. Thereby the user receives continuous feedback on their current location and is continuously guided through the configuration of the of the security perimeter(s) I, II, III, IV.

In an embodiment, the preliminary physical layout of the security perimeter I, II, III, IV is displayed on the display of the mobile communication device 3 as 2D or 3D augmented-reality (AR) content overlaid on a live feed provided by a camera connected with, or integrated into, the mobile communication device 3. This augmented-reality visualization enables the user to more quickly orient themselves in the secure control area A and therefore be guided by the received layout information more efficiently. In addition to, or instead of, the display, the mobile communication device 3 may comprise or be connected to an AR headset or AR smart glasses.

Further, if the user provided user inputs indicating a current relationship of the location of the mobile communication device 3 to the barrier 5, the location information associated with those user inputs is used to associate the location information with a position of the barrier 5. The layout information relating to the physical layout of the security perimeter I around the barrier 5 is then generated using the location information. For example, from a known location of a barrier 5, the physical layout of the security perimeter I, II, III, IV is generated as having a circular or semi-circular shape centered on the barrier 5 with a particular radius.

In an embodiment, the location(s) of the mobile communication device 3 along with the user inputs are used to determine installation location information, which can include the installed position of the access control device 2. For example, the user of the communication device 3 moves to a particular position whose location is pre-determined, for example standing in front of the barrier 5, and provides a user input indicating the current relationship of the mobile communication device 3 to the particular location. The location of the barrier 5, for example, is known, as it is comprised in the layout information of the security control system. A relative location between the access control device 2 and the mobile communication device 3 is determined using the UWB transmission(s) between the access control device 2 and the mobile communication device 3. The relative location, along with the pre-determined location of the particular position is used to determine installation location information, which can include the installed position of the access control device 2.

Depending on the embodiment, the access control device 2 has, in the layout information, associated with it a planned position. Using the above steps an installed position is confirmed as corresponding to the planned position. Alternatively, the relative location is used to determine a correction value relating to a deviation of the installed position to the planned position, and refining the layout information includes using the correction value. In an embodiment, the user, via user inputs, confirms or adjusts the planned position such that the installed position corresponds to the planned position.

| List of reference numerals | |
|---|---|
| security control system | 1 |
| server computer | 11 |
| access control device | 2, 2.1, 2.2, 2.3 |
| ultra-wideband transceiver | 21 |
| processor | 22 |
| communication module | 23 |
| mobile communication device | 3 |
| ultra-wideband communication module (of the mobile communication device) | 31 |
| secure control area | A |
| security perimeter (I, II, III, IV) | I, II, III, IV |
| barrier | 5, 5.1, 5.2, 5.3, 5.4 |
| cloud-based server computer | 6 |

What is claimed is:

1. A method for configuring a security control system of a secure control area, the method comprising steps of:
   exchanging UWB transmission(s) between a mobile communication device and one or more access control devices of the security control system;
   determining location information of the mobile communication device within the secure control area by processing signal properties of the UWB transmission(s), the location information being indicative of one or more location(s) of the mobile communication device within the secure control area;
   receiving, by the mobile communication device, one or more user inputs from a user of the mobile communication device, comprising one or more relationship indication(s) of one or more relationship(s) between the respective location(s) of the mobile communication device and one or more security perimeters of the secure control area; and
   generating layout information relating to a physical layout of the one or more security perimeters within the secure control area using the location information and the one or more relationship indication(s).

2. The method of claim 1, wherein the method comprises:
   determining location information which includes one or more of the following: a distance between the mobile communication device and the one or more access control devices, a 2D or 3D position of the mobile communication device relative to the one or more access control devices, or an absolute physical location of the mobile communication device within the secure control area.

3. The method of claim 1, wherein the method further comprises:
   receiving, by the mobile communication device, from the security control system, layout information relating to a physical layout of the one or more security perimeters;
   generating the one or more relationship indications between the one or more locations of the mobile communication device within the secure control area and the one or more security perimeters using the layout information and the one or more user inputs, wherein the one or more user inputs comprise a user confirmation or denial of the relationship indications generated using the layout information; and
   refining the layout information using the one or more generated relationship indications and the user confirmation or denial.

4. The method of claim 3, wherein the received layout information comprises one or more planned positions of the one or more access control devices, the one or more user inputs further including installation location information for at least one of the one or more access control devices, the installation location information including either a confirmation that an installed position of the at least one access control device in the secure control area corresponds to the planned position, or a correction value relating to a deviation of the installed position to the planned position, and refining the layout information further includes using the installation location information.

5. The method of claim 1, wherein the method further comprises:
   determining a tolerance range for the one or more security perimeters, wherein the tolerance range is determined using one or more of the following: a variance in the location information determined at a particular time point, a user input defining a tolerance range, or a tolerance range included in the layout information; and
   generating the layout information including one or more expanded security perimeters for the one or more security perimeters using the tolerance range.

6. The method of claim 1, wherein the method further comprises:
   receiving, by the mobile communication device, the one or more user inputs further including a relative position of the mobile communication device to a barrier of the security control system, and
   generating the layout information using the one or more relative positions included in the one or more user inputs, the layout information further including a partition, which partition divides the security perimeter into two parts either side of the barrier.

7. The method of claim 1, wherein the method further comprises:
   obtaining, by the mobile communication device, location sensor data from position and/or movement sensors comprised by and/or communicatively connected to the mobile communication device including one or more of: an accelerometer, a GPS receiver, a geomagnetic sensor, or a barometer; and
   determining the location information and/or generating the layout information further using the location sensor data.

8. The method of claim 1, wherein generating the layout information is performed by the mobile communication device.

9. The method of claim 1, further comprising determining, by the security control system, the location information of the mobile communication device by processing the signal properties of the UWB transmissions, and transmitting, from the security control system to the mobile communication device, the location information.

10. The method of claim 1, further comprising transmitting the one or more user inputs to the security control system, and
    determining, by the security control system, the location information of the mobile communication device by processing the signal properties of the UWB transmissions, upon receipt of the one or more user inputs, respectively; and
    generating, by the security control system, the layout information using the location information.

11. A non-transitory computer-readable storage medium comprising computer-executable instructions which, when executed by a processor of a mobile communication device, causes the mobile communication device to perform a method for configuring a security control system, the method comprising:
    exchanging UWB transmission(s) between the mobile communication device and one or more access control devices of the security control system;
    determining location information of the mobile communication device within a secure control area by processing signal properties of the UWB transmission(s), the location information being indicative of one or more location(s) of the mobile communication device within the secure control area;
    receiving, by the mobile communication device, one or more user inputs from a user of the mobile communication device, comprising one or more relationship indication(s) of one or more relationship(s) between the respective location(s) of the mobile communication device and one or more security perimeters of the secure control area; and
    generating layout information relating to a physical layout of the one or more security perimeters within the secure control area using the location information and the one or more relationship indications.

12. An access control device of a security control system of a secure control area, the access control device comprising an ultra-wideband UWB transceiver, a processor, and a memory, and wherein the processor is configured to perform a method for configuring the security control system, the method comprising:
    exchanging UWB transmission(s) between a mobile communication device and one or more access control devices of the security control system;
    determining location information of the mobile communication device within the secure control area by processing signal properties of the UWB transmission(s), the location information being indicative of one or more location(s) of the mobile communication device within the secure control area;
    receiving, by the mobile communication device, one or more user inputs from a user of the mobile communication device, comprising one or more relationship indication(s) of one or more relationship(s) between the respective location(s) of the mobile communication device and one or more security perimeters of the secure control area; and
    generating layout information relating to a physical layout of the one or more security perimeters within the secure control area using the location information and the one or more relationship indications.

13. The access control device of claim 12, wherein the access control device is communicatively connected to one or more barriers and is configured to control access through the one or more barriers according to the layout information of the one or more security perimeters associated with the one or more barriers.

14. A system comprising a security control system of a secure control area and a mobile communication device, the security control system comprising an access control device, and wherein the mobile communication device and the access control device are configured to perform a method for configuring the security control system, the method comprising:
    exchanging UWB transmission(s) between the mobile communication device and one or more access control devices of the security control system;
    determining location information of the mobile communication device within the secure control area by processing signal properties of the UWB transmission(s), the location information being indicative of one or more location(s) of the mobile communication device within the secure control area;

receiving, by the mobile communication device, one or more user inputs from a user of the mobile communication device, comprising one or more relationship indication(s) of one or more relationship(s) between the respective location(s) of the mobile communication device and one or more security perimeters of the secure control area; and generating layout information relating to a physical layout of the one or more security perimeters within the secure control area using the location information and the one or more relationship indications.

* * * * *